US012766652B2

(12) United States Patent
Goodwin et al.

(10) Patent No.: US 12,766,652 B2
(45) Date of Patent: Oct. 20, 2026

(54) MULTI-POINT DOVETAIL CLAMPING SYSTEM FOR PRECISION CNC WORKHOLDING

(71) Applicants: Derek Evan Goodwin, Gilroy, CA (US); Michael Wayne Whitten, Carson City, NV (US)

(72) Inventors: Derek Evan Goodwin, Gilroy, CA (US); Michael Wayne Whitten, Carson City, NV (US)

( * ) Notice: Subject to any disclaimer, the term of this patent is extended or adjusted under 35 U.S.C. 154(b) by 279 days.

(21) Appl. No.: 18/769,258

(22) Filed: Jul. 10, 2024

(65) Prior Publication Data

US 2026/0014656 A1 Jan. 15, 2026

(51) Int. Cl.
*B23Q 3/06* (2006.01)

(52) U.S. Cl.
CPC .................................... *B23Q 3/06* (2013.01)

(58) Field of Classification Search
CPC ..... B25B 1/103; B25B 1/2405; B25B 1/2452; B25B 1/2473
USPC .................................. 269/91, 165, 246, 265
See application file for complete search history.

(56) References Cited

U.S. PATENT DOCUMENTS

| | | | | | |
|---|---|---|---|---|---|
| 5,096,172 | A * | 3/1992 | Mills | B25B 1/103 | 269/286 |
| 6,435,496 | B1 * | 8/2002 | Phillips | B25B 5/10 | 269/94 |
| 11,759,914 | B2 * | 9/2023 | Thielges | B25B 1/103 | 269/43 |
| 2014/0197587 | A1 * | 7/2014 | O'Rell | B23Q 1/42 | 269/246 |

* cited by examiner

*Primary Examiner* — Jason L Vaughan
(74) *Attorney, Agent, or Firm* — PatentPC PowerPatent; Bao Tran

(57) ABSTRACT

A dovetail workholding device for CNC machining is disclosed that ensures even force distribution between the dovetail intersection of the workpiece and the pivot heel of the clamp. This design improves stability and precision, reducing the risk of workpiece slippage or deformation during machining operations.

14 Claims, 3 Drawing Sheets

SECTION A-A

COMPONENTS

MULTI-POINT DOVETAIL CLAMPING SYSTEM FOR PRECISION CNC WORKHOLDING

BACKGROUND OF THE INVENTION

The present one embodiment relates to the field of manufacturing, and more specifically to workholding devices used in computer numerical control (CNC) machining processes. CNC machining is a process used in manufacturing that involves the use of computers to control machine tools. Tools that can be controlled in this manner include lathes, mills, routers, and grinders. The term "CNC" stands for Computer Numerical Control, which means that a computer converts the design produced by Computer Aided Design (CAD) software into numbers. These numbers can be considered to be the coordinates of a graph and they control the movement of the cutter. In order to execute a precise cut, the workpiece must be held in a fixed position.

Traditional workholding devices, such as vises and chucks, can be quite effective but have limitations in terms of accessibility and setup time, especially when dealing with complex geometries. Dovetail workholding provides an alternative by engaging the workpiece with a complementary, often triangular-shaped, geometry. This method allows for a substantial amount of the workpiece to be accessible for machining, which is particularly advantageous for 5-axis machining operations where the ability to work on multiple sides of a part without additional setups is highly desirable.

In CNC machining, secure workholding is crucial for rigidity. Traditional dovetail clamps often utilize a cantilever design, which can lead to uneven force distribution and potential slippage or damage to the workpiece. This invention addresses these issues by providing a dovetail clamp that ensures even force distribution, enhancing stability and accuracy during machining.

SUMMARY OF THE INVENTION

In one aspect, a workholding device is disclosed for use in CNC (Computer Numerical Control) machining applications with a dovetail body and a dovetail clamp designed to distribute clamping force evenly between the dovetail geometry of the workpiece and the pivot heel of the clamp. The device employs a dovetail mechanism for securing the workpiece with a dovetail body that engages with the corresponding dovetail geometry of a workpiece, ensuring robust and precise positioning.

In another aspect, a dovetail workholding device includes a dovetail body configured to engage with a dovetail geometry of a workpiece, a clamp with a pivot heel positioned to contact the workpiece at a point distal to the dovetail intersection, and a clamping mechanism configured to apply force simultaneously to both the dovetail intersection and the pivot heel, ensuring even force distribution.

In implementations, the clamping mechanism includes a screw, pneumatic, or hydraulic actuator for force application. The pivot heel allows the clamp to pivot to accommodate variations in workpiece geometry. The force distribution mimics the action of a toe clamp, providing balanced horizontal and vertical force application. The workholding device integrates a clamping system having a clamp with a pivot heel. The clamping mechanism, which can be a screw, pneumatic, or hydraulic actuator, applies force in a manner that balances the pressure between the dovetail intersection and the pivot heel. By doing so, the device maintains even force distribution across the workpiece, enhancing stability and minimizing the potential for workpiece deformation during machining.

Advantages may include one or more of the following. The dovetail workholding device for CNC machining offers reliable and adaptable securing of workpieces, with an emphasis on even force distribution and versatility in accommodating various workpiece geometries. The pivot heel is designed to adapt to variations in workpiece geometry. This adjustability allows for versatile usage across different machining projects that may have slight differences in workpiece dimensions or profiles. Additionally, the force distribution pattern of the clamp resembles the behavior of a toe clamp, thereby offering a balanced application of horizontal and vertical clamping forces. This aspect of the design is crucial for maintaining a secure hold on the workpiece, preventing movement, and permitting precise, high-quality machining operations.

One implementation introduces a clamp equipped with a pivot heel in addition to a robust clamping mechanism, such as a screw, pneumatic, or hydraulic actuator. The incorporation of these features ensures the even force distribution across the engagement surfaces of the workpiece, which is important for maintaining accuracy during machining operations. Moreover, the pivot heel feature allows the clamp to accommodate tolerances and variations in workpiece geometries, adding versatility and adaptability to the workholding device. The mechanism's design, which mimics a toe clamp, is advantageous for applying balanced forces both horizontally and vertically, thus maintaining a secure hold on the workpiece while granting extensive access for CNC tools. This innovative design enhances the efficiency and reliability of CNC machining by reducing setup times and minimizing the risk of errors or component damage, representing significant advancements in the field of CNC machine workholding.

BRIEF DESCRIPTION OF DRAWINGS

The invention is to be explained in more detail below with reference to exemplary embodiments and in connection with the figures. In the drawing:

FIG. 2 shows a detailed view of pivot module while

DETAILED DESCRIPTION OF THE INVENTION

Figure 1:
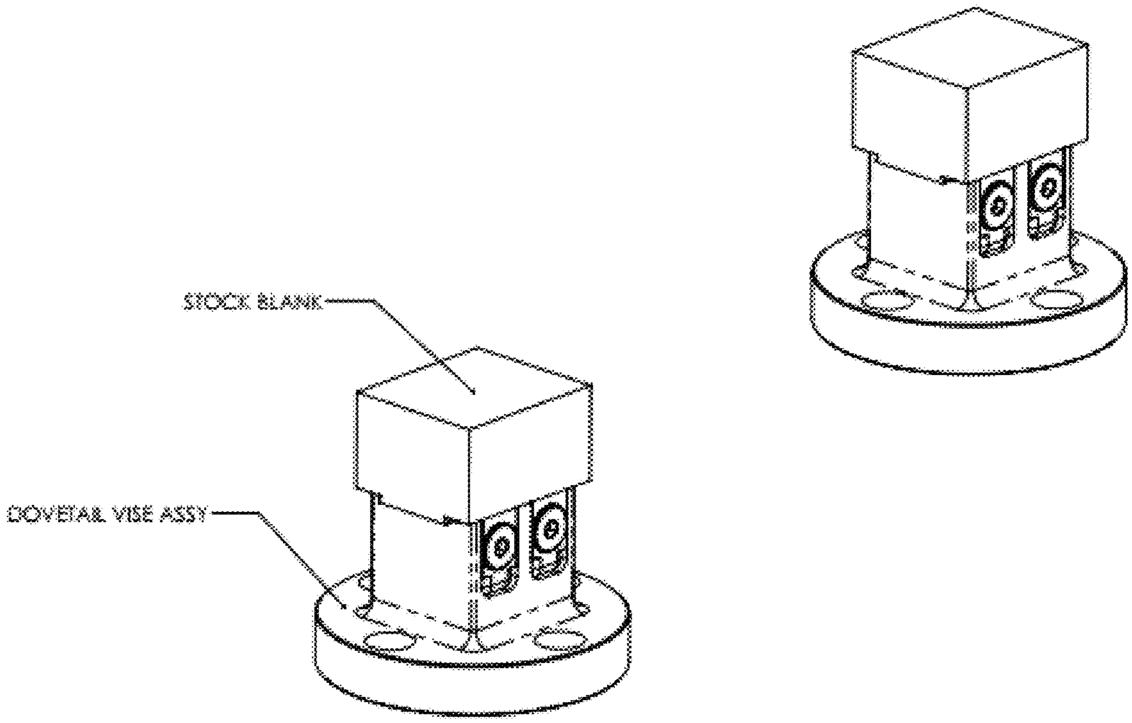
FIG. 1 shows an exemplary workpiece holder.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 2:
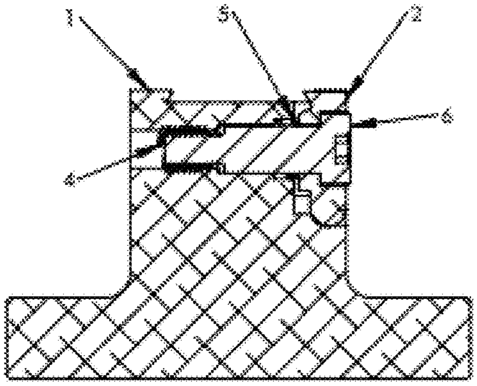
Figure 2:
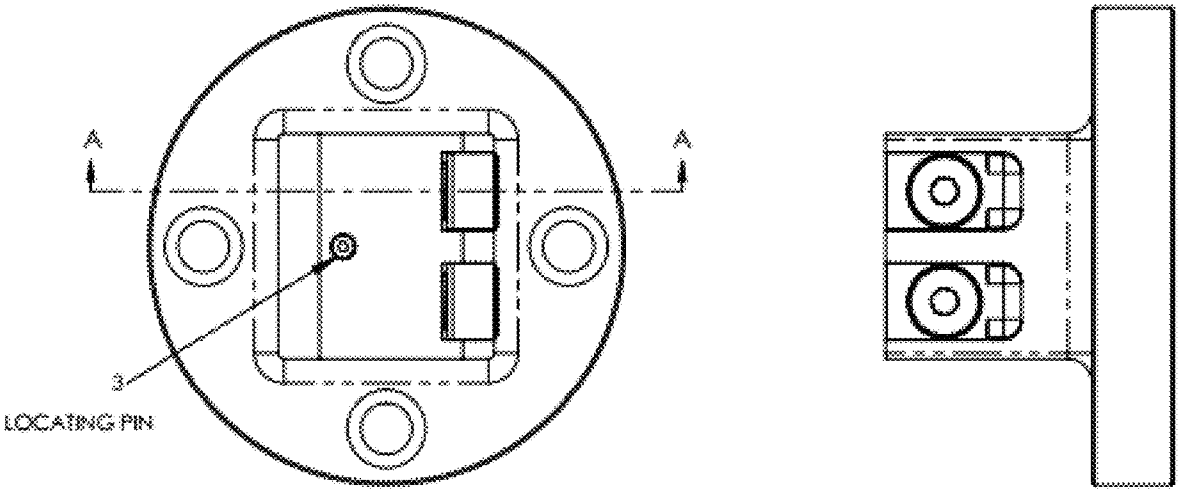
Figure 3:
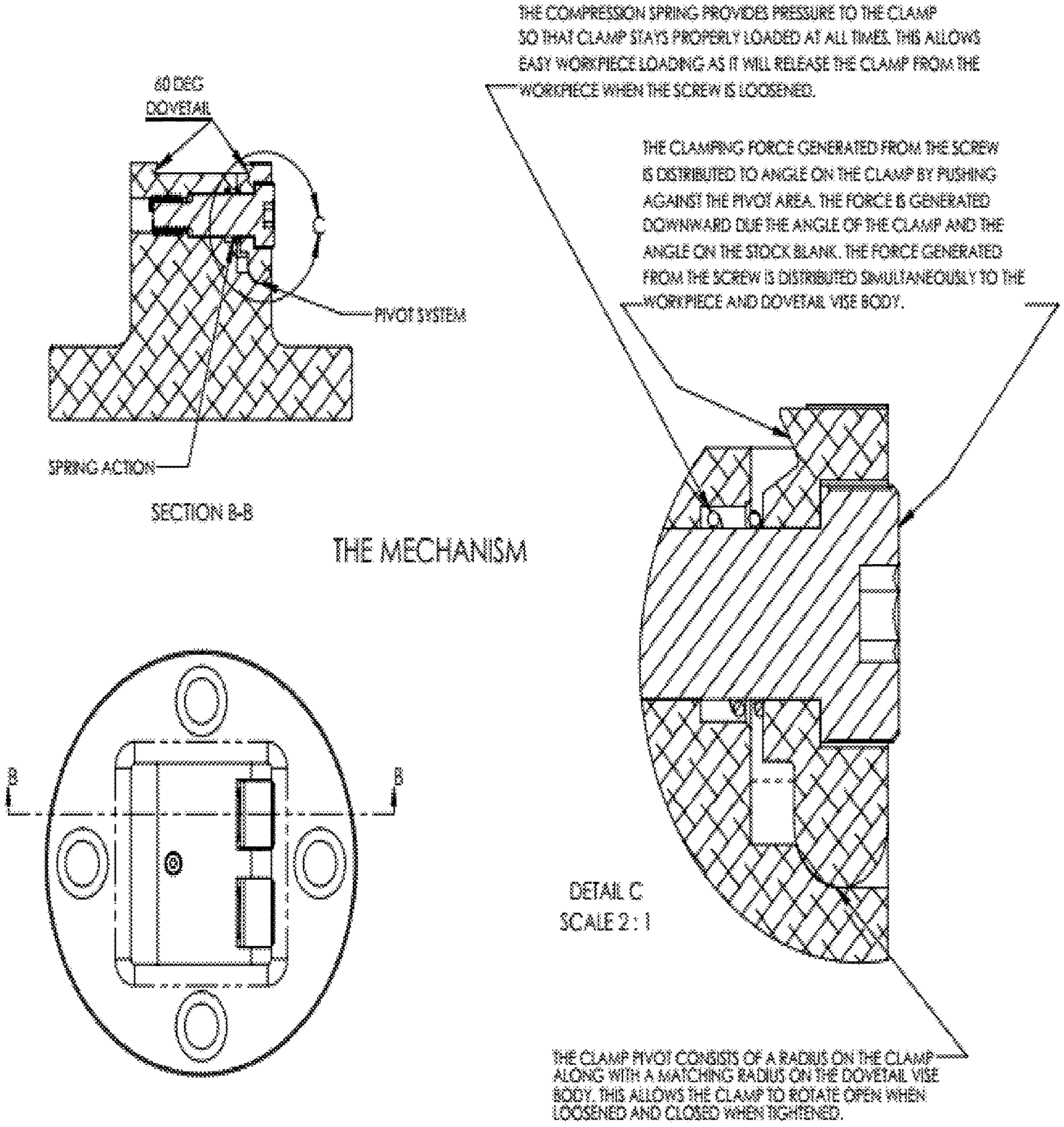
FIG. 3 shows the pivot module on a clamp.

FIGS. 1-3 show an exemplary dovetail workholding device with a dovetail body, a dovetail clamp with a pivot heel, and a clamping mechanism. The clamp is designed to engage with the dovetail geometry of the workpiece and the clamp engages with dovetail geometry on the opposite side, providing the opposing clamping force. The pivot heel provides a secondary point of contact for the clamp. The clamping mechanism, when activated, applies force simultaneously to both the dovetail intersection and the pivot heel, ensuring even force distribution.

FIGS. 1-3 illustrate a detailed design of a dovetail workholding device for CNC machining applications, which aligns closely with the claims described in the query. The dovetail body designed to engage with the dovetail geometry of a workpiece. The dovetail shape is clearly visible in the cross-sectional views (Section A-A and Section B-B). A clamp with a pivot heel: contacts the workpiece at a point distal to the dovetail intersection. The device uses a screw-based clamping mechanism, as described in the annotations. This mechanism is designed to apply force simultaneously to both the dovetail intersection and the pivot heel, ensuring even force distribution.

FIG. 2 shows the dovetail workholding device in more details with a pivot system 6 that includes Dovetail Vise Body 1, Clamp 2, Screw/locating pin 3, Thread 4, and Spring Action 5. The dovetail vise body 1 forms the main structure, the clamp 2 secures the workpiece, the screw/locating pin 3 is part of the clamping mechanism, the spring action 5 provides constant pressure, and the pivot system 6 allows the clamp to adjust to variations in workpiece geometry.

One embodiment of the clamping mechanism uses a screw for force application. The pivot heel allows the clamp to pivot, as illustrated in FIG. 3, which shows the radius on the clamp and the matching radius on the dovetail vise body.

The force distribution mimics the action of a toe clamp. The annotations explain that the clamping force is distributed to the angle on the clamp by pushing against the pivot area, generating downward force due to the angle of the clamp and the angle on the stock blank.

A compression spring is incorporated into the design to provide constant pressure to the clamp, ensuring it stays properly loaded at all times. This feature allows for easy workpiece loading as it will release the clamp from the workpiece when loosened. The design includes multiple components such as the dovetail vise body, clamp, screw, and spring, all working together to create an effective workholding solution for CNC machining applications. The clamping force generated from the screw is distributed simultaneously to the workpiece and dovetail vise body, as described in the annotations.

The dovetail body features a dovetail profile that matches the dovetail geometry of the workpiece. This precise fit ensures secure engagement and stability during machining operations. A clamp also features a dovetail profile that matches the dovetail geometry on the opposing side. A pivot heel on the clamp is positioned to make contact with the clamp body at a point distal to the dovetail intersection. This heel rests in a cavity with matching geometry on the dovetail body and allows the clamp to pivot to accommodate slight variations in workpiece dovetail geometry. At the precise vertical position, the clamp is equally engaged with the workpiece dovetail geometry and the dovetail body heel cavity, ensuring consistent force application and providing the clamping force.

The clamping mechanism consists of a screw, or pneumatic, or hydraulic actuator that, when tightened, applies force to both the dovetail intersection and the pivot heel. This dual-point force application prevents the workpiece from tilting or shifting, maintaining alignment, rigidity and precision. The workholding device provides a balanced force distribution between the dovetail geometry and the pivot heel. This balanced force mimics the action of a toe clamp, where force is applied both horizontally and vertically, ensuring maximum contact and stability.

The compression spring provides constant pressure to the clamp, ensuring that it stays properly loaded at all times. This feature offers two advantages:

a. Easy workpiece loading: When the clamping mechanism is loosened, the spring helps to release the clamp from the workpiece, making it easier to insert or remove parts.

b. Consistent clamp positioning: The spring keeps the clamp in a ready position, ensuring it's always prepared to engage with the workpiece when tightening begins.

The clamping force distribution in this device is designed to be efficient and balanced, mimicking the action of a toe clamp. The clamping force is initially generated by the screw mechanism. The force from the screw is transmitted to the angle on the clamp by pushing against the pivot area. Due to the angle of the clamp and the angle on the stock blank (workpiece), the force is directed downward. This downward force helps to secure the workpiece firmly against the dovetail body. Force generated from the screw is distributed simultaneously to both the workpiece and the dovetail vise body. This simultaneous distribution ensures that the workpiece is held securely while also maintaining the integrity of the dovetail engagement.

The design allows for balanced horizontal and vertical force application. This balance is crucial for maintaining the workpiece's position and preventing any unwanted movement during machining operations. The pivot heel of the clamp works in conjunction with this force distribution system. It allows the clamp to pivot and accommodate variations in workpiece geometry while still maintaining effective clamping force.

The dovetail workholding device distributes the clamping force evenly between the dovetail geometry of the workpiece and the pivot heel of the clamp. This design mimics the functionality of a toe clamp, offering superior stability and reducing the risk of workpiece slippage or deformation.

One embodiment relates to a workholding device designed for use in CNC (Computer Numerical Control) machining applications, particularly a device that employs a dovetail mechanism for securing the workpiece. The inventive device includes a dovetail body that engages with the corresponding dovetail geometry of a workpiece, ensuring robust and precise positioning The dovetail workholding device includes a dovetail body, a clamp with a pivot heel, and a clamping mechanism. The dovetail body is configured to engage with a dovetail geometry on a workpiece to provide a stable and secure hold. The clamp is fashioned with a dovetail profile complementary to the dovetail profile on the workpiece, and is designed to engage the opposite side of the dovetail geometry on the workpiece, thereby providing an opposing clamping force.

The pivot heel is a feature of the clamp that makes contact with the dovetail body at a point away from the dovtail intersection. This heel is designed to rest within a cavity that has a geometry matching that of the heel on the dovetail body, which allows the clamp to pivot. This pivoting capability is essential for accommodating slight variances in workpiece dovetail geometries, thus allowing the clamp to be equally engaged with the workpiece dovetail geometry and the cavity in the dovetail body, resulting in consistent application of clamping force.

The clamping mechanism can be a screw, pneumatic, or hydraulic actuator. When this mechanism is activated, it applies force in a manner that affects both the dovetail intersection and the pivot heel. This dual-point application of force is critical to prevent the workpiece from tilting or otherwise shifting during machining operations, thus maintaining alignment, rigidity, and the precision of the machining process.

An innovative aspect of the workholding device is the balanced distribution of clamping force between the dovetail geometry of the workpiece and the pivot heel of the clamp, which bears resemblance to the force imparted by toe clamps. The force is applied both horizontally and vertically which enhances overall stability and maximizes contact area, thereby preventing workpiece slippage or distortion. This feature ensures that even if there are discrepancies in the geometry of a workpiece due to manufacturing tolerances, the device can adaptively maintain consistent clamping pressure, thus safeguarding the integrity of the workpiece and the accuracy of the machining operation.

In another embodiment, a dovetail workholding device for CNC machining applications includes a dovetail body, a clamp with a pivot heel, and a clamping mechanism. The dovetail body is configured to engage with a dovetail geometry of a workpiece, presenting a profiled surface that interfaces with a corresponding profiled surface on the workpiece. The clamp is arranged with respect to the dovetail body such that it can engage with the dovetail geometry on the opposite side of the workpiece relative to the dovetail body. The contact point of the pivot heel is established on a side of the clamp that is opposite the side interfacing with the dovetail geometry, providing a counterbalancing leverage point.

The clamping mechanism is responsible for delivering the required clamping force to secure the workpiece in place during machining operations. This mechanism is configured to apply force simultaneously to the dovetail intersection, where the dovetail body engages with the workpiece, and to the pivot heel of the clamp. Such an arrangement ensures an even distribution of force along both the horizontal and vertical axes of the engaged surfaces. The clamping mechanism may employ a variety of actuation methods, including a manually operated screw, a pneumatic actuator, or a hydraulic actuator, chosen based on desired operational parameters such as required clamping force, the speed of actuation, and modulation of clamping pressure.

The pivot heel feature of the clamp plays a critical role in the adaptability of the device. It allows the clamp to pivot, which accommodates variations in the workpiece's dovetail geometry that could arise due to manufacturing tolerances or surface finish discrepancies. This pivoting action is enabled by a cavity in the dovetail body with matching geometry to the pivot heel, or similarly by a design of the heel and its interface that allows for angular adjustment relative to the main clamping force direction.

One of the most significant aspects of the force distribution in this dovetail workholding device is its ability to mimic the action of a toe clamp. By providing balanced horizontal and vertical force application, the workholding device ensures a secure grip on the workpiece, minimizing any potential for shifting or tilting that could detract from the machining precision. The even force distribution helps to maintain the workpiece's integrity, preventing deformation or damage due to excessive localized pressure.

The dovetail workholding device embodies an improvement in the technical field of CNC machining workholding solutions. It presents a reliable means of securing workpieces with dovetail geometry, enhancing stability, and precision during the machining process, and offering versatility to accommodate a range of workpiece sizes and shapes with varying tolerances. The device, through its unique combination of features, provides significant advancements over conventional clamping methods, contributing to the optimization of CNC machining workflows.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of securing a workpiece for CNC machining, comprising:

providing a dovetail workholding device with a dovetail body and a clamp with a pivot heel;

engaging the dovetail body with a dovetail geometry of the workpiece;

positioning the pivot heel to contact a pivot area of the dovetail body at a point spaced from a dovetail intersection between the dovetail body and the dovetail geometry of the workpiece; and applying force simultaneously to both the dovetail intersection and the pivot heel using a clamping mechanism.

2. The method of claim 1, wherein applying force comprises actuating a screw, pneumatic, or hydraulic mechanism.

3. The method of claim 1, further comprising allowing the clamp to pivot via the pivot heel to accommodate variations in workpiece geometry.

4. The method of claim 1, wherein applying force comprises distributing the force to mimic the action of a toe clamp, providing balanced horizontal and vertical force application.

5. The method of claim 1, further comprising maintaining constant pressure on the clamp using a compression spring to ensure proper loading of the clamp.

6. The method of claim 5, further comprising loosening the clamping mechanism; and allowing the compression spring to release the clamp from the workpiece for easy workpiece loading or unloading.

7. The method of claim 1, wherein applying force comprises generating initial force using a screw mechanism; transmitting the force to an angle on the clamp by pushing against a pivot area; and creating a downward force due to the angle of the clamp and an angle on the workpiece.

8. The method of claim 1, further comprising distributing the applied force simultaneously to the workpiece and the dovetail vise body.

9. The method of claim 1, wherein positioning the pivot heel comprises aligning a radius on the clamp with a matching radius on the dovetail vise body to create a pivot point.

10. The method of claim 9, further comprising pivoting the clamp open when loosening the clamping mechanism; and pivoting the clamp closed when tightening the clamping mechanism.

11. A dovetail workholding device for CNC machining applications, comprising:

a dovetail body configured to engage with a dovetail geometry of a workpiece;

a clamp with a pivot heel positioned to contact a pivot area of the dovetail body at a point spaced from the dovetail intersection between the dovetail body and the dovetail geometry of the workpiece; and a clamping mechanism configured to apply force simultaneously through the dovetail intersection and the pivot heel, thereby distributing clamping force.

12. The dovetail workholding device of claim 11, wherein the clamping mechanism, includes a screw, pneumatic, or hydraulic actuator for force application.

13. The dovetail workholding device of claim 11, wherein the pivot heel allows the clamp to pivot to accommodate variations in workpiece geometry.

14. The dovetail workholding device of claim 11, wherein the force distribution mimics the action of a toe clamp, providing balanced horizontal and vertical force application.

* * * * *